Figure 13:
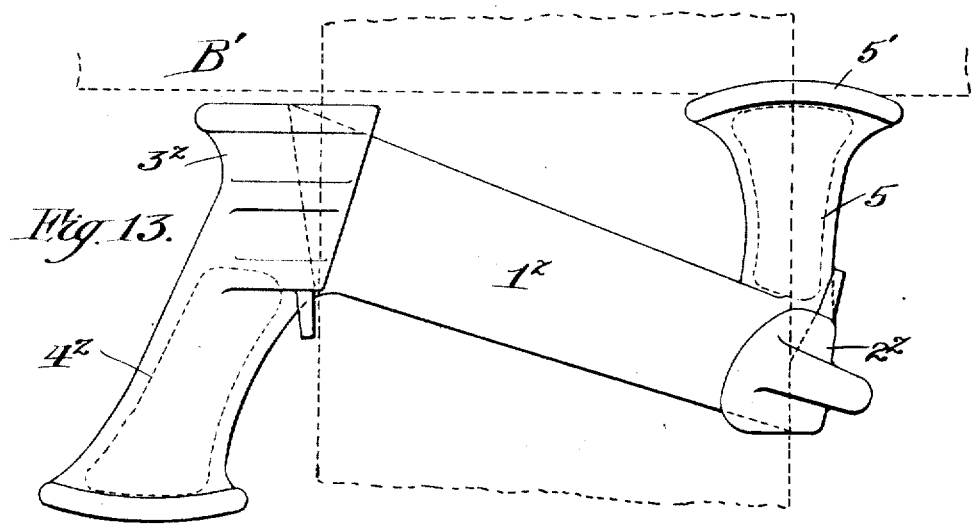

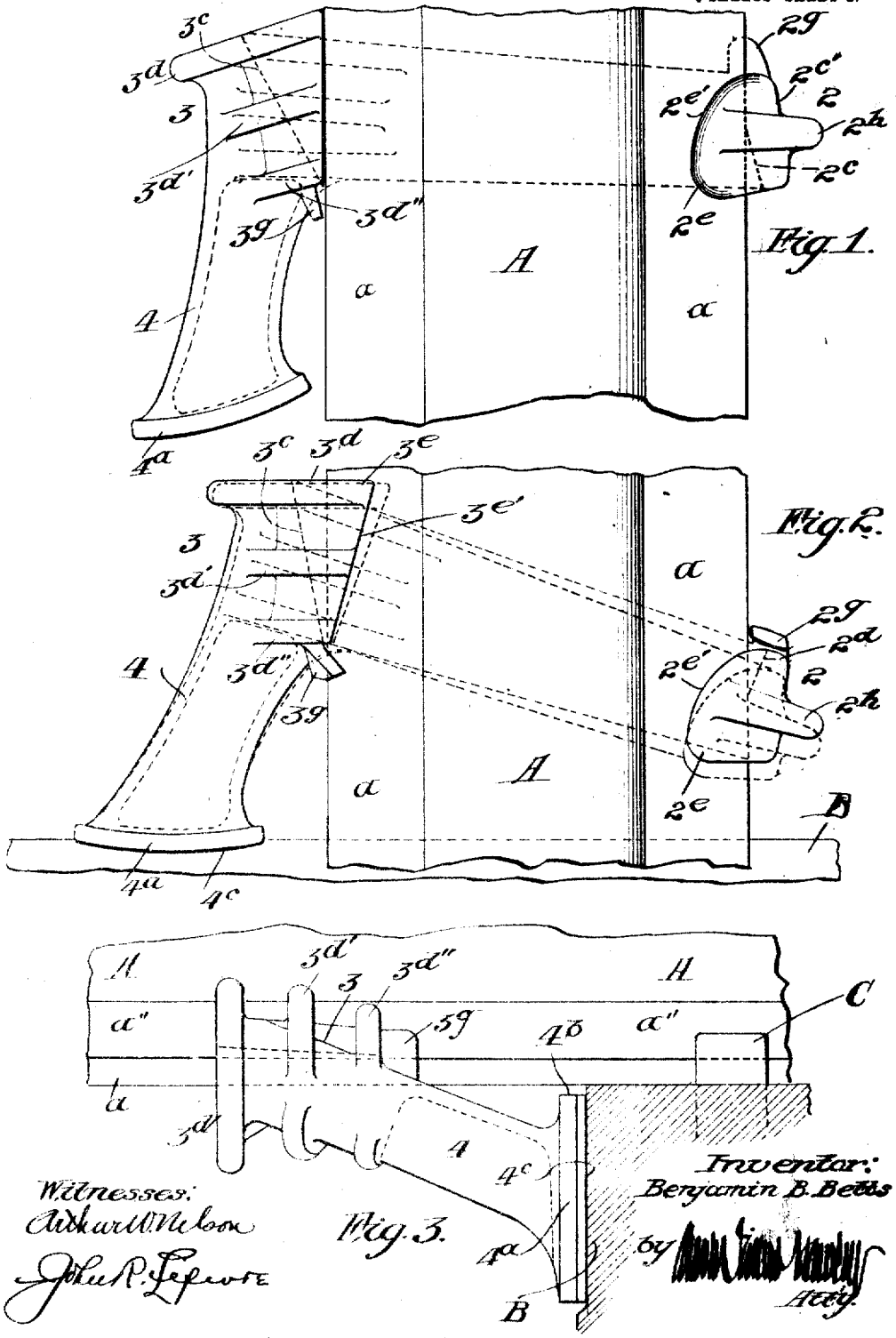

B. B. BETTS.
RAIL ANCHOR.
APPLICATION FILED NOV. 9, 1908.
915,655.
Patented Mar. 16, 1909.
6 SHEETS—SHEET 2.
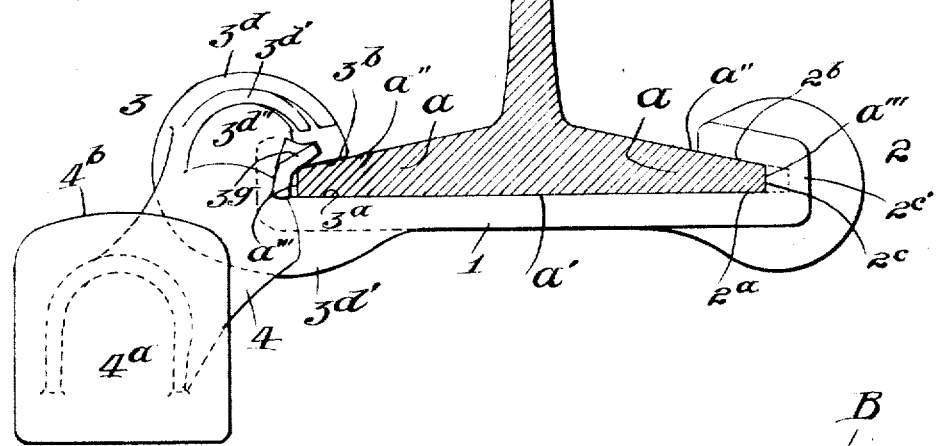
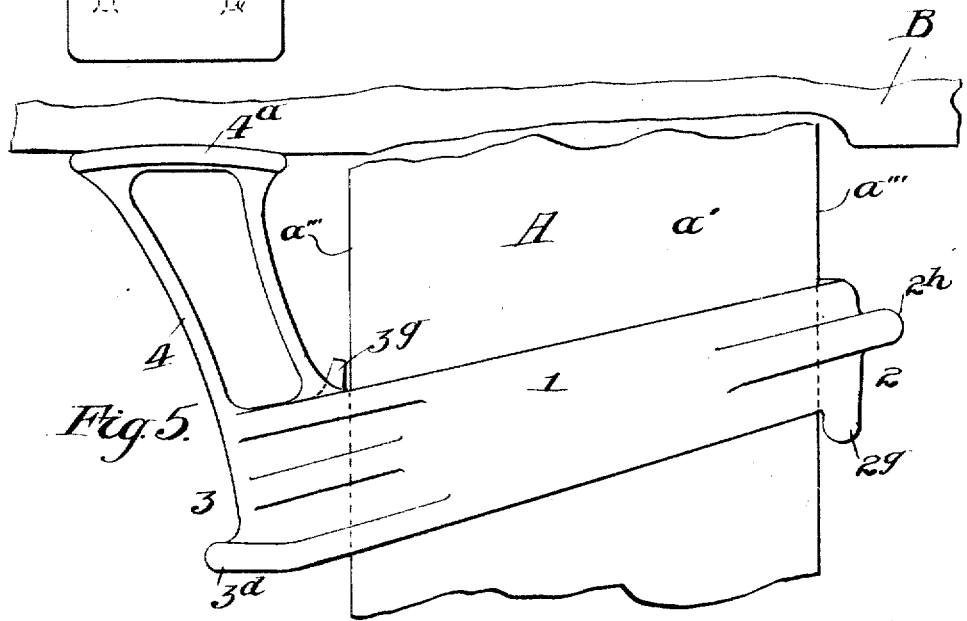
Witnesses:
Arthur W Nelson
John R. Lepore
Inventor:
Benjamin B. Betts
by [signature]
Atty

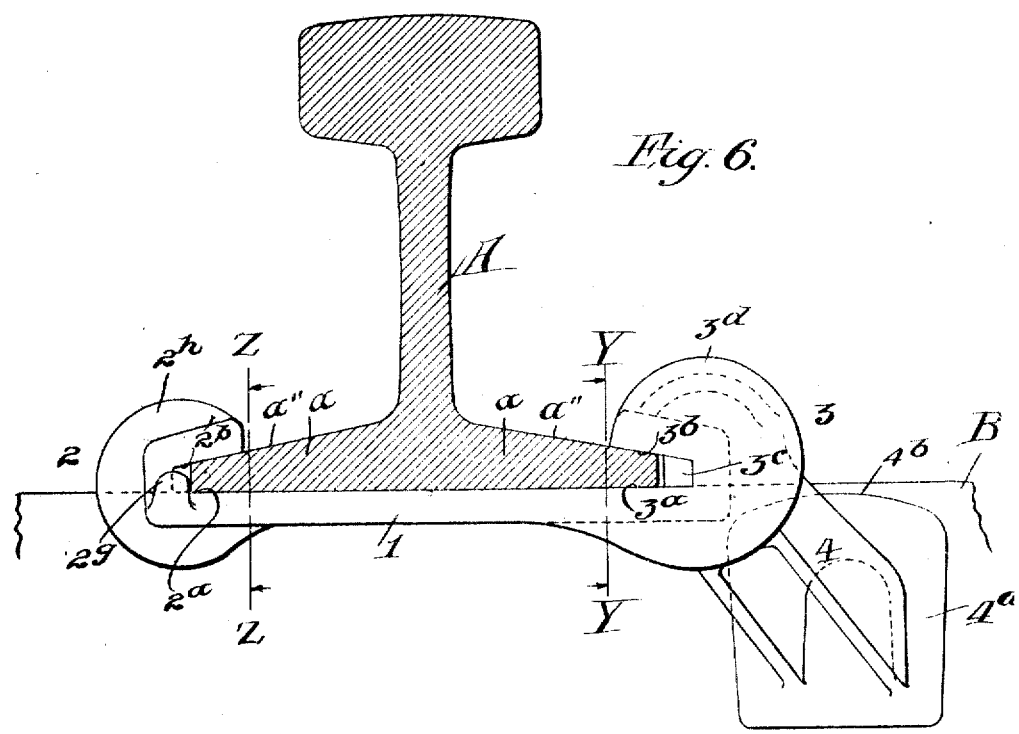

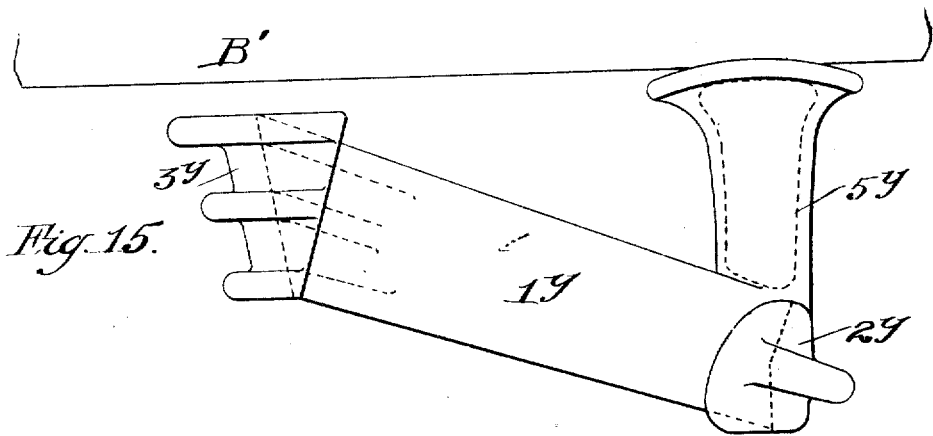
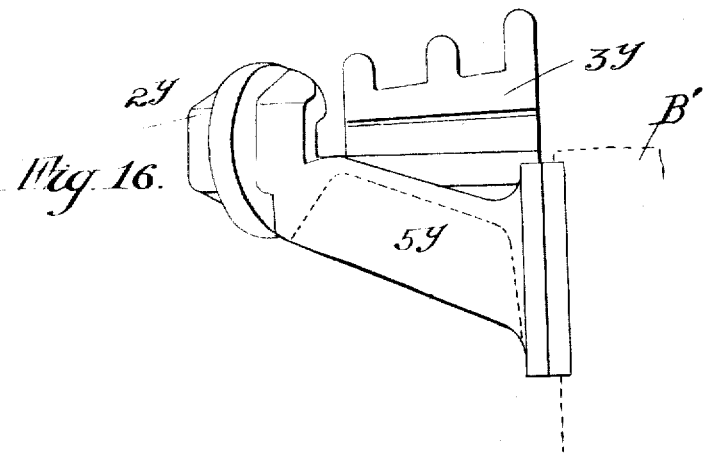

B. B. BETTS.
RAIL ANCHOR.
APPLICATION FILED NOV. 9, 1908.
915,655.
Patented Mar. 16, 1909.
6 SHEETS—SHEET 6.
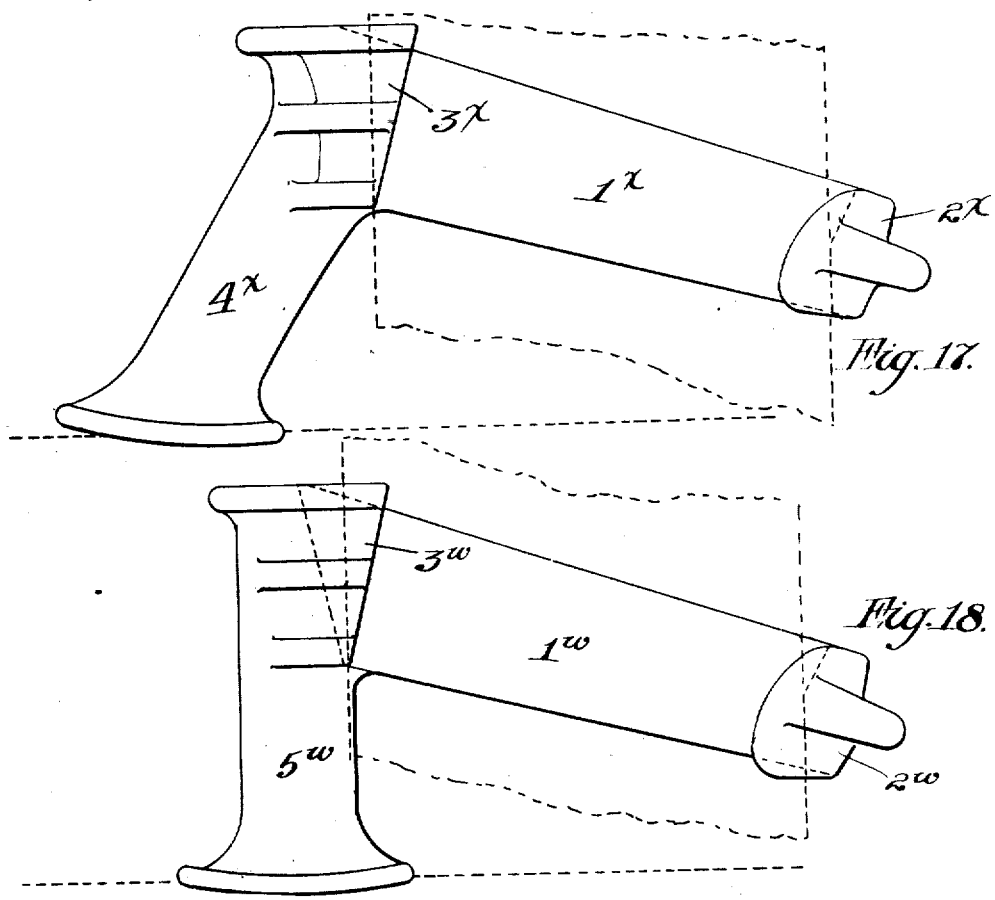
Witnesses:
Inventor:
Benjamin B. Betts
by 
Atty.

UNITED STATES PATENT OFFICE.

BENJAMIN B. BETTS, OF ST. LOUIS, MISSOURI.

RAIL-ANCHOR.

No. 915,655.  Specification of Letters Patent.  Patented March 16, 1909.

Application filed November 9, 1908. Serial No. 461,707.

*To all whom it may concern:*

Be it known that I, BENJAMIN B. BETTS, a citizen of the United States, and a resident of the city of St. Louis, Missouri, have invented certain new and useful Improvements in Rail-Anchors, of which the following is a full, true, and exact description, such as will enable others skilled in the art to make and use the same.

My invention relates to means for preventing the longitudinal movement or creeping of railroad rails and has particular reference to improvements in devices of the class known as rail anchors or anti-creepers.

The object of my invention is to provide a rail anchor which shall be readily applicable to and removable from a rail, which having been applied to a rail shall be adapted to coöperate with an adjacent cross tie and effectively resist and prevent longitudinal movement of the rail thereon and which shall be simple, strong and durable.

A further object of my invention is to provide a rail anchor or anti-creeper which after being placed on a rail and against a cross tie will be automatically tightened upon the rail by the longitudinal thrust thereof.

Another object of the invention is to provide a rail anchor or anti-creeper which shall be adapted for application to and coöperation with a rail without modification in the form or contour of the latter and without resort to bolts, rivets, wedges or other auxiliary adjusting, clamping or fastening means.

A further and special object of the invention is to provide a rail anchor which shall be complete in one piece or member, of great strength and effectiveness, so formed that it may be quickly applied to a rail and secured or locked thereon without resort to special tool or wrenches.

Another object of the invention is to provide a rail stay which shall be capable of retaining its locking or clamping position upon the rail when the latter, by reason of the reversal of the tide of traffic, moves backwardly and thus carries the anchor away from the tie.

Still another object of the invention—one which is particularly related to the use of anti-creepers or anchors upon bridge structures where the ties are close together, is to provide a rail anchor which shall be adapted for alternate coöperation with adjacent ties; in other words, one which shall be adapted to maintain its hold upon the rail and prevent excessive backward creeping thereof.

Still further objects of my invention will appear hereinafter.

My invention resides, generally, in a rail anchor or anti-creeper which comprises a bar having rail engaging portions or hooks at its ends together with a strut, lug or arm formed at one end of said bar and adapted to hold said end away from the cross tie while permitting the other end of the bar to move toward the cross tie, whereby said portions or hooks, having been engaged with opposite sides or edges of the rail, will be tightened thereon by the pivoting or turning movement of said bar upon the rail.

The invention also includes various novel parts and constructions, hereinafter described, which insure the complete performance of the functions of a positive rail anchor or anti-creeper.

I have shown several, though not all, forms and features of my invention in the accompanying drawings. These drawings constitute a part of this specification and by reference thereto a thorough understanding of the invention may be secured.

Figure 14:
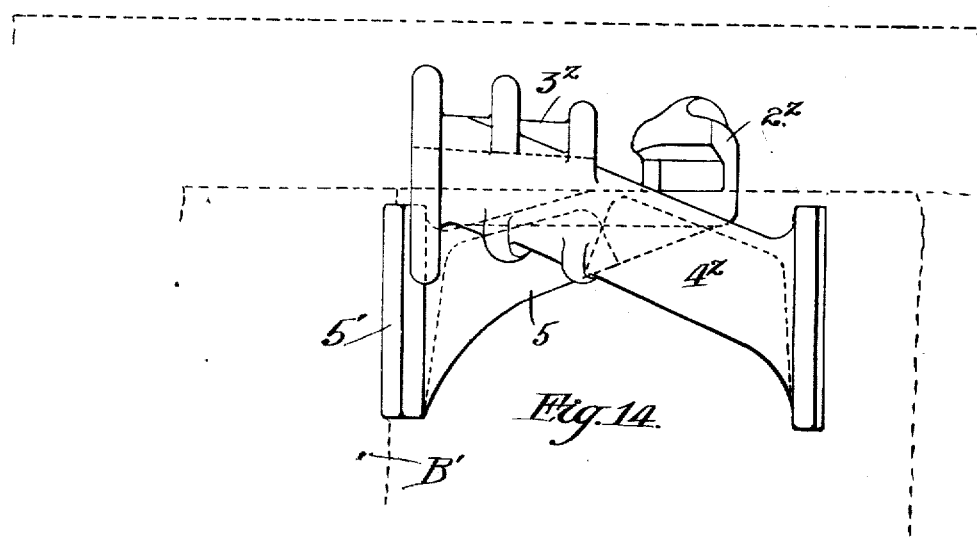

Figure 1 of the drawings is a plan view of a rail and an anti-creeper or anchor embodying my invention, showing the manner of applying the anchor to the rail; Fig. 2 is a plan view of a rail and a cross tie, with my rail anchor in working position thereon; Fig. 3 is an end view of the cross tie, anchor and rail; Fig. 4 shows the end of the rail and the side of the rail anchor, being an elevation in the plane of the side of the cross tie, as upon line X of Fig. 3; Fig. 5 is a plan view of the rail and rail anchor in inverted position; *i. e.*, from beneath; Fig. 6 is an elevation of the opposite side of the rail anchor, being the reverse of Fig. 4; Fig. 7 is a sectional view of the rail anchor on the line Y—Y of Fig. 6; Fig. 8 is a sectional view on the line $Y^1$—$Y^1$; Fig. 9 is a sectional view on the line $Y^2$—$Y^2$; Fig. 10 is a sectional view on the line Z—Z of Fig. 6; Fig. 11 is a sectional view on the line $Z^1$—$Z^1$ of Fig. 10; Fig. 12 is a sectional view on the line $Z^2$—$Z^2$ of Fig. 10; Fig. 13 is a plan view of a modified form of my rail anti-creeper, adapted to work in both directions; Fig. 14 is an end view of the anchor shown in Fig. 13; Fig. 15 illustrates a further modification of the invention, in which the strut or arm is arranged on the opposite end of the bar; Fig. 16 is an end view thereof; Figs. 17, and 18 are plan views illustrating further modifications of the invention; of the kind which will readily suggest themselves to others who are skilled in the art.

Throughout the drawings, A, represents a rail and B a cross tie. The rail here shown is of ordinary cross section having the usual T base flanges, $a$—$a$. The bottom, $a'$, of the rail is flat and the upper surfaces, $a''$, of the flanges are slightly inclined.

$a''$—$a'''$ are the edges of the rail base.

The cross tie, B, is the usual wooden or metal cross tie, upon which the rail rests, the rail and the cross tie being arranged at right angles. Spikes or other fastenings, C, (Fig. 3) as usual, serve to prevent the lateral displacement of the rail on the tie, but these devices do not prevent the longitudinal movement or creeping of the rail across the tie. My invention is designed to prevent such longitudinal movement of the rail.

That form of my invention which is illustrated in Figs. 1 to 12 comprises a single piece or single member rail anchor or anti-creeper. This device is made up of four principal parts or integral portions, namely the bar portion, 1, the rail engaging portions or hooks, 2 and 3, and the strut, arm or lug, 4. When placed in one position (see Fig. 1) the device may be readily raised into engagement with the bottom of the rail and interlocked with the edges or flanges thereof. The space between the rail engaging portions, 2 and 3, is greater than the width of the rail. This makes it possible to put the device on the rail as described. After is it thus positioned it may be pivoted, rotated moved or twisted upon the rail as indicated in Fig. 2. This movement between the anchor and the rail serves to decrease the transverse distance between the rail engaging portions of the device and thus moves them into working engagement with the rail flanges. At the time that the anchor is pivoted or twisted on the rail its arm, 4, is also set up against the tie, B, (see Fig. 2) and as the hooks or engaging parts, 2 and 3, are in locking positions at such time and as bodily movement of the anchor is prevented by the tie, it is obvious that the anchor secures the rail against movement toward and upon the tie. It is also evident that any forward movement of the rail will serve to further turn or clamp the anchor upon the rail, as such movement tends to increase the angularity of the engaged parts.

The bar portion, 1, of the rail anchor is preferably rectangular in cross section, such being the best disposition of metal to resist the tension to which the bar is subjected, when the portions 2 and 3, are strongly pressed against the rail. The width of the bar is sufficient to give it the necessary strength to resist the bending force to which it is subjected in work when either hook, serves as the fulcrum. The top surface of the bar is preferably flat to fit the bottom, $a'$, of the rail. The hook, 2, forms a continuation of the bar, 1, and its lower surface, $2^a$, is coincident with the top of said bar. The upper surface $2^b$, of the hook conforms to the inclined top of the rail flange. The end surface, $2^c$, is shaped to fit the edge $a'''$ of the rail and is of considerable longitudinal extent affording contact at many points. The clamping surface, $2^c$, is preferably of less width than the hook, the latter being cut back on the outer side (see dotted line $2^d$) to increase the effective distance between the hooks 2 and 3, as hereinafter more fully described. The end or point, $2^e$, of the hook preferably overhangs the inner edge of the bar, 1, $i$. $e$. the edge adjacent to the tie, B, and the end $2^{e'}$ of the hook is curved or beveled rearwardly and outwardly to meet the vertical portion, $2^{c'}$. I prefer that the upper surface, $2^b$, of the hook shall have the relation to the lower surface, $2^a$, which is shown in Figs. 10, 11 and 12. The space between these surfaces at the outer end, $2^f$ of the hook gap being greater than the thickness of the rail base at such point and the space at the inner end, $2''$, being preferably less than the thickness of the rail base between points of engagement. The greater space at the outer end of the hook gives the necessary freedom in placing the anchor on the rail and the relative contraction of the space in the other part of the hook, 2, insures the gripping of both the top and bottom of the rail base and causes the hook to score the rail and wedge tightly thereon as well as engage the edge of the rail when the anchor is shifted from the position of Fig. 1 to that shown in Fig. 2. The elasticity of the metal hook permits both the vertical and horizontal engagement referred to.

$2^g$ is a malleable or bendable lug formed on the outer side of the hook 2, to be bent up at the edge of the rail as explained hereinafter. An integral rib, $2^h$, preferably in line with the neutral axis of the bar, 1, adds to the strength of the hook, 2. This rib merges with the end of the hook and with the underside of the bar at the point of juncture between the bar and hook.

The hook, 3, at the opposite end of the bar, 1, is preferably of a different form than the hook, 2, and it does not engage the edge of the rail base; instead the engagement between the rail base and the hook, 3, is limited to the top and bottom surfaces thereof. The rail base forming a wedge between the complementary locking surfaces of the hook or rail engaging portion, 3. As in the case of the hook, 2, the hook 3, forms a continuation of the bar, 1. Its lower surface $3^a$, is preferably coincident with the top of the bar and the upper surface, $3^b$, is inclined to correspond to the inclined top of the rail base to be engaged thereby. The end surface, $3^c$, i. e. the bottom of the V groove or gap in the hook is formed at a very considerable angle to the main axis of the bar, 1, to stand away from the edge of the rail, even when the anchor is fully engaged therewith, as indicated in Figs. 2 and 6. In other words the bottom of the groove or gap in the hook, 3, is too small to admit the edge of the rail and hence the pressure of the hook on the rail is exerted through the relatively inclined surfaces, $3^a$ and $3^b$ and not through the surface, $3^c$; hence lateral and rotative movement of the anchor on the rail, causes the hook, 3, to more and more tightly wedge upon the top and bottom of the rail base, the hook actually exerting compressive force thereon in a vertical direction as contrasted with compressive force against the edge of the rail. As the surfaces $3^a$ and $3^b$ move inwardly upon the base, the area of frictional contact increases very rapidly and the clamping effect of this hook or jaw, 3, is sufficient to prevent the rail from creeping or moving therein. I prefer that the hook, 3, shall be wider than the hook, 2, and I preferably strengthen the same by means of three ribs, $3^d$, $3^{d'}$ and $3^{d''}$. These ribs are integral with the hook and merge with the end thereof and with the bar, 1, at the point of juncture between the hook and said bar. On the top the ribs, $3^d$, are preferably set to be at right angles to the rail when the device is in working position, such being the most effective position in relation to the forces which tend to open or spread the point or end of the hook. On the bottom the ribs are preferably arranged in line with the bar, the same being here called upon to prevent the bending down of the hook as a whole upon the end of the bar. The extreme point or outer end, $3^e$, of the hook, 3, preferably overhangs the outer or remote edge of the bar, 1, and in this manner I secure an extension of the clamping surface, $3^b$, without sacrificing any part of the free rail receiving space between the two hooks. The form of the V groove or gap in the hook, 3, will be readily understood upon reference to Figs. 6 to 9. The end, $3^{e'}$, of the hook, 3, is at substantially right angles to the bar, 1, i. e., to the axis thereof. The surface, $2^d$, of the hook, 2, is substantially parallel with the end, $3^{e'}$, of the hook, 3, and the width between these parts slightly exceeds the width of the rail base. Therefore in putting the anchor on the rail one edge of the rail is entered in the hook, 2, and the bar, 1, being thrown at substantially right angles to the rail, the end of the hook, 3, may be raised past the opposite edge of the rail; very slight twisting of the anchor on the rail then serves to turn the end or point of the hook, 3, over the edge of the rail and interlock the rail and anchor. The further the device is angled or twisted on the rail, the tighter it is clamped thereon, for once the hook, 3, binds or clamps upon the rail, the tension from the hook, 2, as it moves toward the tie, draws the hook, 3, more and more firmly upon the rail, until the combined pressure of the hooks becomes so great as to prevent further movement. But this, obviously, would not be the case if the hook, 3, were not held at a substantially fixed distance from the tie during the forward movement of the free end of the anchor. It will be obvious also that the point $3^e$ of the hook, 3, when rotatively engaged with the rail, will slightly compress or score the top thereof. This compression or scoring of the rail by the opposite hooks, as stated, interlocks the rail and anchor and prevents retrogressive movement of the anchor, when the latter is removed from rail pressure against the tie.

My invention contemplates the employment of a simple bar with the described hooks upon its ends and with a separate strut or fastening on the tie to serve as a stop for the remote end of the angled bar. It will be evident that such a device would perform the functions required. For several reasons I prefer that the strut or stop portion through which the thrust of the rail is communicated to and taken up by the cross tie shall be an integral part of the rail anchor. I prefer also that the cramping clamp constituted by the bar and the two hooks shall have an actual power arm to the end that the pressure to which the device is subjected between the rail and the tie shall be resolved into forces which tend to thrust the V or wedging hook laterally against the rail base as well as to increase the cramping action of the two hooks thereon and both permit and aid the movement of the free end of the bar toward the cross tie. I therefore employ an arm or strut 4, which is integral with and joins the hook, 3. This strut merges into the back of the hook and the ribs thereon at one end adding considerably to the strength of said hook. It is preferably inclined downwardly and forwardly toward the tie and also outwardly away from the rail, as clearly shown in Figs. 2 and 3. The end of the arm is enlarged to form the pressure foot, $4^a$, for which the tie serves as the abutment. I prefer that the upper end, $4^b$, of the foot shall be somewhat below the plane of the bottom of the rail for two reasons; first, to facilitate the placing of the anchor on the rail, and second, to effect the downward cramping action upon the body of the rail anchor. It is desirable also to avoid direct pressure upon the relatively weak corner edge of the tie. As the rail anchor, when in locked position and in tightening, rocks upon the pressure foot as a fulcrum, I prefer to form the foot as a rocker and to this end I curve its broad bearing surface, 4ᶜ, as shown in Figs. 2 and 3. It will be obvious that as the hook, 2, moves toward the tie, the pressure foot will move outwardly upon the side of the tie and the curved bearing surface permits this movement and prevents the splintering or tearing of the tie. The arm, 4, may be round or oval in cross section and either solid or hollow, but in most cases I prefer that its cross section shall be of an inverted U shape, as shown by dotted lines in several figures and by full lines in Fig. 6. The strut or arm, 4, is most effectively arranged at substantially right angles to the main axis of the device and I prefer that it shall form a slightly obtuse angle with the inner edge bar, 1, thereby securing the advantages of both a strut and a power arm. It will now be evident that from the moment that the two hooks grip the rail, either actual movement of the rail toward the tie or end thrust thereon effected through the power arm strut will tend to force the wedging leg upon the rail and increase the angularity of the device as a whole thereon. The parts or members of the device are formed to resist the maximum end thrust of the rail and the self gripping or automatic resisting action of the connected hooks insures the retention of the rail after the anchor has been firmly set by hammer blows and slight initial creeping of the rail.

I preferably form a malleable or bendable lip or lug, 3ˢ, upon the inner end of the hook, 3, corresponding to the lug, 2ˢ, on the hook, 2, but oppositely positioned. The original or initial positions of the lugs, 2ˢ and 3ˢ, appear in Fig. 1, from which it will be noted that they in no wise interfere with the easy placing of the anchor on the rail. But when the anchor has been forced into place these lugs, as shown in Fig. 2, may be bent against corresponding edges of the rail a light hammer being used for this purpose. The lugs are so positioned that the blows of the hammer tend to tighten the anchor upon the rail and after the lugs have been bent the cross bar cannot return to the perpendicular position of Fig. 1, for it is then held at two widely separated points at each end; hence, it cannot retrogress or assume a position which would allow it to drop off the rail when the anchor is carried away from the tie by reverse creeping of the rail. I regard the use of the bendable back stops or lugs, 2ˢ and 3ˢ, as distinctly advantageous and I prefer them instead of a back stop pin which I have sometimes employed, but it should be understood that even when they are not used, my anchors rarely become loose for the reason that the contact between the wedging leg and the rail is widely extended and prevents vibratory displacement of the anchor when relieved from pressure. It follows that my device possesses the advantage of maintaining its locked position when the rail backs away from the tie and is merely restored to working position between the rail and the tie when the rail returns, no added creeping of the rail being required to reset the anchor at such times.

Although the rail anchor retains its position when the thrust on the rail is reversed by a change in the tide of traffic on the railroad, it would not be effective if the reverse creeping were sufficient to carry it backward against the next tie. This sometimes occurs in ordinary tracks and frequently happens on bridges, where the ties are placed close together. These facts have led me to modify my rail anchor to meet the requirements of rails which frequently change their direction of movement. One such modification is shown in Figs. 13 and 14 and consists primarily in the duplication of the arms or struts, in reverse position upon opposite ends of the body of the anchor. In this form of my device the bar, 1ˣ, the hooks, 2ˣ, 3ˣ and the arm, 4ˣ, and the bending lugs are employed in substantially the form above described, and a strut, 5, is added at the end, 2ˣ, of the device. As shown this strut may be shorter than the opposite strut, as the bar is not apt to assume a greater angle during the short period of reversed traffic. As the hook, 2ˣ, is not capable of lateral movement and is not materially aided by an end thrust, such as is imposed on the wedging lug, I prefer that the strut, 5, shall be smaller than the strut, 4ˣ, and that it shall be substantially parallel with the rail. It is provided with a curved face, 5', and constitutes a pivotal strut by which the end, 2ˣ, is held away from the tie, while the end, 3ˣ, is left free to move toward the tie, B'. An anchor of this kind when fixed on the rail effectively limits the movement of the rail in both directions and it possesses many advantages over those devices which are made in several pieces and which are always loosened by the reversal of the rail movement.

In Figs. 15 and 16 I have illustrated a very desirable form of my invention comprising a bar, 1ʸ, a wedging hook, 3ʸ, an abutting hook, 2ʸ, and a short, acute angled strut, 5ʸ, the same being an equivalent of the Fig. 13 device with the strut, 4ˣ, omitted. As shown in Fig. 16, the pressure foot of the strut terminates short of the bottom surface of the rail and in applying this device to the rail, the strut swings beneath the same until the end of the lug, 3ʸ, parallels the edge of the rail so that the device may be interlocked with the base thereof. Then the pressure foot is set against the tie, B', and the hook, 3ʸ, is driven back toward the tie to clamp the anchor on the rail. Thereafter further creeping or pressure of the rail simply tends to draw the wedging lug more firmly thereon and to bind the hook, $2^y$, against the opposite edge of the rail. The turning or twisting movement of the device is accompanied by rotary movement of the strut, about a center which is substantially coincident with the hook, $2^y$, the distance between said hook and the tie remaining substantially constant.

An obvious modification of my invention is shown in Fig. 17, wherein the advantages of the bell crank form of Fig. 1 are retained but an abutting hook, $3^x$, replaces the wedging hook before described. The external form of the hook resembles that of the hook, 3, and the strut, $4^x$, the bar, $1^x$ and hook, $2^x$, are substantially identical to corresponding parts in Figs. 1 to 6.

The invention may be further modified in a device of the kind shown in Fig. 18, wherein an abutting lug, $2^w$, a bar, $1^w$, and a wedging lug, $3^w$, of previously defined forms, are combined with an acute angled strut, $5^w$.

Having thus described my invention, I claim as new and desire to secure by Letters Patent:

1. A rail anchor comprising a cross bar having integral rail base engaging hooks angularly disposed upon its ends and provided with an offset power arm integral with one of said hooks, formed to exert diagonal thrust upon its hook and to hold it away from the cross tie while permitting and aiding the other hook to move toward the cross tie, one of said hooks being formed to rotate in a horizontal plane and wedge upon the top and bottom of the rail base, substantially as described.

2. A rail anchor comprising a cross bar having integral rail base engaging hooks angularly disposed upon its ends and provided with an integral strut at one end to hold the corresponding hook away from a cross tie, the whole being rotatable in a horizontal plane, one of said hooks being formed after the manner of an external wedge adapted to receive the edge of a rail base and engageable only with the top and bottom thereof.

3. A rail anchor comprising a cross bar having rail engaging hooks upon its ends, the whole being rotatable in a horizontal plane, said hooks being respectively formed to engage the edge of the rail base and the top and bottom only of the rail base, and a strut integral with one end of the bar for holding that end away from a cross tie, substantially as described.

4. A rail anchor comprising a cross bar having integral rail engaging hooks angularly disposed upon its ends, the whole being rotatable in a horizontal plane, one of said hooks being formed to wedge upon and engage only the top and bottom of the rail base, and a strut integral with the bar and wedging hook for holding the latter away from a cross tie while permitting the other hook to move toward the cross tie.

5. A rail anchor comprising a cross bar having rail engaging portions upon its ends, one of said portions being integral therewith and comprising a wedging hook adapted to rotate in a horizontal plane and to engage only the top and bottom of a rail flange; and an integral strut at one end of said bar terminating in a pressure foot for holding said end away from the cross tie.

6. A rail anchor comprising a cross bar having rail engaging portions upon its ends, one of said portions being integral therewith and comprising a wedging hook adapted to rotate in a horizontal plane and to engage only the top and bottom of a rail flange, and an integral strut at one end of said bar terminating in a curved or rocker pressure foot for holding said end away from the cross tie.

7. A rail anchor comprising a cross bar and an integral power arm forming with the inner side of said bar an angle of at least ninety degrees, an integral wedging hook formed upon said bar at its juncture with said arm, for horizontal rotative engagement with the top and bottom only of the rail base, and rail base engaging means at the free end of said bar.

8. A rail anchor comprising a cross bar and an integral strut or arm arranged at an angle to the bar and terminating in a pressure foot or end for engagement with the cross tie, a rail base engaging hook upon the end of said bar and another rail base engaging hook at the juncture between said bar and strut, one of said hooks being adapted for rotative transverse movement upon and engagement with only the top and bottom of the rail base, substantially as described.

9. A rail anchor comprising a cross bar and an integral strut or arm substantially perpendicular to the inner side of said bar and terminating in a pressure foot or end for engagement with a cross tie, a rail base engaging hook upon the end of said bar and another rail base engaging hook at the juncture between said bar and strut, one of said hooks being a wedging hook adapted to move transversely upon the rail base and engageable only with the top and bottom thereof, and the other hook being adapted for engagement with the edge of the rail base, substantially as described.

10. A rail anchor comprising a cross bar and an integral strut or arm substantially perpendicular to the inner side of said bar and terminating in a pressure foot or end for engagement with a cross tie, a rail base engaging hook upon the end of said bar, and another rail base engaging hook at the juncture between said bar and strut, one of said hooks being a wedging hook adapted to move transversely upon the rail base and engageable only with the top and bottom thereof, and the other hook being adapted for engagement with the edge of the rail base and also the top and bottom thereof, substantially as described.

11. A rail anchor comprising a cross bar, relatively staggered rail engaging hooks thereon, and a substantially perpendicular power arm at the end of said bar, the wedging hook adjacent to the juncture of the strut and bar having a V groove or gap shaped to receive and wedge upon said rail base by horizontal rotative movement thereon, substantially as described.

12. A rail anchor adapted to co-act with a rail and cross tie and comprising a bar having integral rail base holding hooks angularly disposed upon its ends, and both containing V gaps to receive and wedge upon the edges of a rail base by transverse rotative movement thereon, one only of the hooks being adapted to engage also the edge of the rail, and an integral substantially right angled strut extending from one end of said bar and terminating in a pressure foot having a curved rocking surface, substantially as described.

13. A rail anchor which is capable of and adapted for twisting, rotary movement on a rail after being positioned thereon and comprising rigidly connected hooks to engage opposite edges of the rail, one of said hooks being formed for transverse wedging action only upon the top and bottom of the rail base and an offset power arm strut for holding the last mentioned hook away from the cross tie, substantially as described.

14. A rail anchor which is capable of and adapted for twisting, rotary movement on a rail after being positioned thereon and comprising a cross bar, relatively staggered rail base engaging hooks angularly disposed on said bar, one formed for transverse wedging action only upon the top and bottom of the rail base and an integral strut for holding one end of the bar away from the cross tie, substantially as described.

15. A rail anchor which is capable of and adapted for twisting, rotary movement on a rail after being positioned thereon and comprising a cross bar, relatively staggered rail base engaging hooks integral with the ends thereof, one formed for transverse wedging action only upon the top and bottom of the rail base and an integral strut extending perpendicularly from one end of said bar, constituting a power arm and terminating in a rocking, pressure foot, substantially as described.

16. A rail anchor comprising a cross bar, an integral rail engaging hook or clamp on one end of said bar and formed to engage only the top and bottom of the rail base for transverse wedging action thereon, a second rail engaging hook integral with the other end of said bar, the gap between said hooks being sufficient to receive a rail when the bar is perpendicular thereto, and a power arm strut integral with and projecting from one end of the bar at an obtuse angle to the inner side of the bar and terminating in a part for working engagement with a cross tie, substantially as described.

17. A rail anchor comprising a cross bar, an integral rail engaging hook or clamp on one end of said bar and formed to engage only the top and bottom of the rail base for transverse wedging action thereon, a second rail engaging hook integral with the other end of said bar for engagement with the edge of the rail base, the gap between said hooks being sufficient to receive a rail when the bar is perpendicular thereto, and a substantially right angled power arm strut projecting from one end of the bar and terminating in a rocking pressure foot for engagement with the side of a tie, substantially as described.

18. A rail anchor comprising a bar having integral rail base engaging hooks relatively angularly disposed upon its ends and an integral power arm strut extending from one of said ends for engagement with a cross tie, one only of said hooks having a gap or groove too small to receive the edge of the rail base and provided with relatively inclined upper and lower wedging surfaces adapted for transverse rotation upon and to subject an extended portion of the rail base to vertical compression, substantially as described.

19. A rail anchor comprising a bar having integral rail base engaging hooks angularly disposed upon its ends, the points of said hooks overhanging opposite sides of said bar for transverse rotative action on the rail base, both said hooks being adapted to wedgingly engage the top and bottom of the rail base, one only thereof adapted to engage the edge of the rail base and an integral strut or arm extending from one of said hooks at substantially right angles to said bar, substantially as described.

20. A one piece rail anchor, comprising a cross bar, a rail base clamping hook at one end of said bar formed to engage only the top and bottom of the rail base and provided with a point which overhangs the side of the bar for transverse rotative action on the rail base, a second rail base clamping hook at the other end of the bar for engagement with the edge of the rail, and means for holding one end of said bar away from the cross tie, substantially as described.

21. A one piece rail anchor, comprising a cross bar, a rail base clamping hook at one end of said bar formed to engage only the top and bottom of the rail base and provided with a point which overhangs the side of the bar, for transverse rotative action on the rail base, a second rail base clamping hook at the other end of the bar for engagement with the edge of the rail, and a power arm strut joining the bar at the first mentioned hook said arm and bar operatively presenting at least a ninety degree angle to the cross tie, substantially as described.

22. A rail anchor comprising a cross bar having rail engaging hooks or portions angularly disposed upon its ends, and cross tie struts extending in opposite directions from opposite ends of said bar, substantially as described.

23. A rail anchor comprising a substantially Z-shaped bar having tie abutments at its ends and rail engaging hooks at its knees, substantially as described.

24. A rail anchor comprising a bar having integral rail engaging hooks angularly disposed upon its ends and one adapted to wedgingly engage only the top and bottom of the rail base, an integral power arm strut extending from the latter hook at substantially right angles to the bar, and another integral strut projecting in the opposite direction from the other hook, as and for the purpose specified.

25. A rail anchor comprising a bar having a cross tie engaging strut at one end and provided with rail engaging hooks angularly disposed upon its ends, and a bendable lug adjacent to one of said hooks to prevent retrogressive movement of the device when secured upon a rail, substantially as described.

26. A rail anchor comprising a bar having a cross tie engaging strut at one end and provided with rail engaging hooks angularly disposed upon its ends, and also provided with bendable lugs adjacent to the respective hooks on opposite sides of the bar for engagement with the edges of the rail to prevent retrogressive movement of the device when secured upon a rail, substantially as described.

27. A rail anchor comprising a cross bar having integral rail base engaging hooks angularly disposed upon its ends, one said hook being formed to rotatively and horizontally wedge upon and engage only the top and bottom of its respective rail base flange, and an offset power arm integral with the bar and the wedging hook, said arm being formed to exert diagonal thrust upon said wedging hook.

28. A rail anchor comprising a cross bar having integral rail base engaging hooks angularly disposed upon its ends, one said hook being formed to rotatively and horizontally wedge upon and engage only the top and bottom of its respective rail base flange, and an offset power arm integral with the bar and the wedging hook, said arm being formed to exert diagonal thrust upon said wedging hook, to hold the same away from the cross tie and to aid the other hook to move toward the cross tie.

29. In a rail anchor, a cross bar having integral rail engaging hooks upon its ends, the whole adapted for rotative action in a horizontal plane, said hooks being respectively formed to engage the edge of a rail base and the top and bottom only of the rail base, and means for holding one end of the bar away from a cross tie and permitting the other end to move toward the cross tie.

30. In a rail anchor, a cross bar having integral angularly disposed relatively staggered rail engaging hooks upon its ends, said hooks being respectively formed to engage the edge of a rail base and rotatively wedge transversely upon the top and bottom only of the rail base, and means for holding one end of the bar away from a cross tie and permitting the other end to move toward the cross tie.

31. A rail anchor comprising connected hooks adapted to engage opposite base flanges of a rail, one of said hooks being formed for transverse wedging action only upon the top and bottom of its respective rail flange, and a power arm integral with the wedging hook for holding it away from a cross tie and adapted to exert diagonal thrust on said hook while permitting the other hook to move toward the cross tie, and adapted to exert diagonal thrust on said wedging hook.

32. A rail anchor which is capable of and adapted for twisting rotary movement on a rail after being positioned thereon and comprising a cross bar, hooks adapted to engage opposite rail base flanges, said hooks being angularly disposed on the ends of said bar, one of said hooks being formed for rotative transverse wedging action only upon the top and bottom of its respective rail flange, and a cross tie engaging portion at and integral with the end of the bar, adjacent to the wedging hook.

In testimony whereof, I have hereunto set my hand, this 30th day of October, 1908, in the presence of two subscribing witnesses.

BENJAMIN B. BETTS.

Witnesses:
JOHN R. LEFEVRE,
M. SIMON.